United States Patent [19]

Amimoto et al.

[11] Patent Number: 5,055,538

[45] Date of Patent: Oct. 8, 1991

[54] NOVEL COPOLYMER AND WATER- AND OIL-REPELLENT COMPRISING THE SAME

[75] Inventors: Yoshio Amimoto; Masayoshi Shinjo; Takashi Enomoto; Kazunori Hayashi, all of Osaka, Japan

[73] Assignee: Daikin Industries Ltd., Osaka, Japan

[21] Appl. No.: 536,073

[22] Filed: Jun. 11, 1990

Related U.S. Application Data

[63] Continuation of Ser. No. 197,917, May 24, 1988, abandoned.

[30] Foreign Application Priority Data

May 25, 1987 [JP] Japan ................................ 62-128968

[51] Int. Cl.$^5$ ............................................. C08F 120/24
[52] U.S. Cl. ..................................... 526/245; 526/243; 526/242
[58] Field of Search ......................... 526/245, 242, 243

[56] References Cited

U.S. PATENT DOCUMENTS

| | | | |
|---|---|---|---|
| 3,356,628 | 12/1967 | Smith et al. | 526/245 |
| 3,901,864 | 8/1975 | Jager | 526/245 |
| 4,296,224 | 10/1981 | Fukui et al. | 526/245 |
| 4,366,299 | 12/1982 | Dessaint | 526/245 |
| 4,742,140 | 5/1988 | Greenwood et al. | 526/245 |
| 4,778,915 | 10/1988 | Lina et al. | 526/242 |

*Primary Examiner*—Joseph L. Schofer
*Assistant Examiner*—N. Sarofim
*Attorney, Agent, or Firm*—Birch, Stewart, Kolasch & Birch

[57] ABSTRACT

A fluorine-containing copolymer comprising (a) 40 to 90% by weight of repeating units derived from a polymerizable compound having a $C_4$–$C_{20}$ perfluoroalkyl group, (b) 5 to 50% by weight of repeating units derived from at least one unsaturated ester selected from the group consisting of stearyl acrylate and stearyl methacrylate, (c) 5 to 50% by weight of repeating units derived from at least one monomer selected from the group consisting of alkyl acrylate or methacrylate having 2 to 8 carbon atoms in the alkyl group, cyclohexylacrylate and cyclohexylmethacrylate, which is useful as an active component of a water- and oil-repellent.

18 Claims, No Drawings

NOVEL COPOLYMER AND WATER- AND OIL-REPELLENT COMPRISING THE SAME

This application is a continuation of application Ser. No. 07/197,917 filed on May 24, 1988, now abandoned.

BACKGROUND OF THE INVENTION

1. Field of the Invention

The present invention relates to a novel copolymer having a perfluoroalkyl group and a water- and oil-repellent comprising the same. More particularly, it relates to a novel copolymer which is capable of imparting good water- and oil-repellency and anti-slipping property to fabrics, and a water- and oil-repellent which has good durability against domestic washing and dry cleaning and stability when it is used in combination with other additives and imparts slipping resistance to fabrics.

2. Description of the Related Art

A water- and oil-repellent comprising a polymer of a polymerizable compound having a perfluoroalkyl group has been known for many years. There have been proposed several copolymers comprising the polymerizable compound having a fluoroalkyl group and at least one other copolymerizable compound such as alkyl acrylate, maleic anhydride, chloroprene, butadiene, methyl vinyl ketone and styrene to be used as water- and oil-repellents in various commercial fields and/or to impart some other properties to these water- and oil-repellents. To improve the water repellency and durability against domestic washing and dry cleaning of the water- and oil-repellent, it is proposed to use, as a water- and oil-repellent, a copolymer comprising the polymerizable compound having the perfluoroalkyl group and an acrylate or methacrylate having a hydroxyl group (cf. Japanese Patent Publication No. 3798/1975). Further, some copolymers comprising the polymerizable compound having the perfluoroalkyl group and at least one other polymerizable compounds having various functional groups are used to improve the water repellency and durability of the water- and oil-repellent. Particularly, a copolymer comprising the polymerizable compound having the perfluoroalkyl group, and stearyl acrylate or methacrylate and 2-hydroxy-3-chloropropyl acrylate or methacrylate is known to have excellent water- and oil-repellency and durability (cf. Japanese Patent Publication No. 8068/1985).

As an increase in the number of properties and more versatile properties are required for the water- and oil-repellent, it is necessary to further increase the quality of the water- and oil-repellent. For example, the water- and oil-repellents comprising the above conventional copolymers do not have sufficient durability and stability when used together with other additives such as a finishing agent. In addition, fabric which has been treated with the conventional water- and oil-repellents, tend to cause slippage of yarns.

SUMMARY OF THE INVENTION

One object of the present invention is to provide a novel fluorine-containing copolymer which is capable of being used as a high quality water- and oil-repellent.

Another object of the present invention is to provide a water- and oil-repellent which is capable of imparting improved water- and oil-repellency and anti-slippage property to a treated fabric.

A further object of the present invention is to provide a water- and oil-repellent which is capable of imparting good water- and oil-repellency, resistance to washing and dry cleaning and anti-slippage property to a treated fabric and has good stability when used together with other additives.

These and other objects are achieved by a fluorine-containing copolymer comprising (a) 40 to 90 % by weight of repeating units derived from a polymerizable compound having a $C_4$–$C_{20}$ perfluoroalkyl group, (b) 5 to 50 % by weight of repeating units derived from at least one unsaturated ester selected from the group consisting of stearyl acrylate and stearyl methacrylate, (c) 5 to 50 % by weight of repeating units derived from at least one monomer selected from the group consisting of alkyl acrylate or methacrylate having 2 to 8 carbon atoms in the alkyl group, cyclohexylacrylate and cyclohexyl/methacrylate and a water- and oil-repellant comprising said copolymer.

Optionally, the copolymer of the present invention may comprise (d) repeating units derived from an acrylate or methacrylate having at least one nitrogen atom, (e) repeating units derived from an acrylate and methacrylate having at least one hydroxyl group or (f) repeating units derived from glycidyl acrylate or methacrylate.

DETAILED DESCRIPTION OF THE INVENTION

Specific examples of the polymerizable compound constituting the repeating unit (a) are the following acrylate and methacrylate:

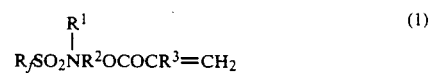

(1)

$$R_fSO_2NR^2OCOCR^3=CH_2$$

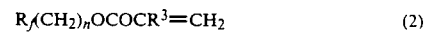

(2)

$$R_f(CH_2)_nOCOCR^3=CH_2$$

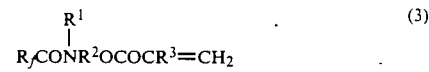

(3)

$$R_fCONR^2OCOCR^3=CH_2$$

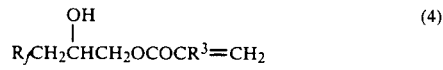

(4)

$$R_fCH_2CHCH_2OCOCR^3=CH_2$$
with OH

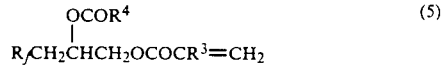

(5)

$$R_fCH_2CHCH_2OCOCR^3=CH_2$$
with $OCOR^4$

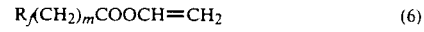

(6)

$$R_f(CH_2)_mCOOCH=CH_2$$

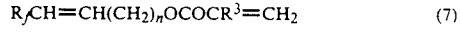

(7)

$$R_fCH=CH(CH_2)_nOCOCR^3=CH_2$$

(6) $R_f(CH_2)_mCOOCH=CH_2$
(7) $R_fCH=CH(CH_2)_nOCOCR^3=CH_2$ wherein $R_f$ is a $C_4$–$C_{20}$ perfluoroalkyl group, $R^1$ is a hydrogen atom or a $C_1$–$C_{10}$ alkyl group, $R^2$ is a $C_1$–$C_{10}$ alkylene group, $R^3$ is a hydrogen atom or a methyl group, $R^4$ is a $C_1$–$C_{17}$ alkyl group, n is a number of 1 to 10, and m is a number of 0 to 10.

The content of repeating units (a) in the copolymer is from 40 to 90 % by weight, preferably from 50 to 90 % by weight. When this content is less than 40 % by weight, the copolymer has insufficient water- and oil-repellency.

The content of repeating units (b) in the copolymer is from 5 to 50 % by weight. When this content is less than 5 % by weight, the copolymer has insufficient water repellency. Preferably, the copolymer contains 15 to 35 % by weight of repeating units (b).

Although repeating units (b) increase the water- and oil-repellency of the copolymer, these units tend to impart an undesired slipping property to the yarns in the fabric and to deteriorate stability when used together with isopropanol in a treatment step. To overcome such defects, repeating units (c) are used according to the present invention.

The content of repeating units (c) is from 5 to 50 % by weight. When this content is less than 5 % by weight, the copolymer cannot sufficiently impart anti-slipping property and the resistance to isopropanol to the treated material. Preferably, the content of repeating units (c) is from 5 to 25 % by weight.

Specific examples of the alkyl acrylate and alkyl methacrylate having 2 to 8 carbon atoms in the alkyl group are ethyl acrylate and methacrylate, isopropyl acrylate and methacrylate, n-butyl acrylate and methacrylate, isobutyl acrylate and methacrylate, cyclohexyl acrylate and methacrylate, 2-ethylhexyl acrylate and methacrylate, and the like.

The monomer or monomers constituting each of the repeating units (a), (b) and (c) may be used as a single compound or as a mixture of two or more compounds.

Optionally, the copolymer may be comprised of repeating units derived from other monomers. Examples of such other monomers are N-methylolacrylamide, N-methylolmethacrylamide, aziridinyl acrylate and methacrylate, diacetoneacrylamide, diacetonemethacrylamide, methylolated diacetoneacrylamide, methylolated diacetonemethacrylamide,2-hydroxy-3-chloropropyl acrylate and methacrylate, hydroxy-$(C_2-C_4)$-alkyl acrylate and methacrylate, monoethyleneglycol monoacrylate and monomethacrylate, polyethylene glycol monoacrylate and monomethacrylate (degree of polymerization of polyethylene glycol being from 2 to 40), ethylene, vinyl acetate, vinyl fluoride, vinyl chloride, acrylamide, methacrylamide, styrene, α-methylstyrene, p-methylstyrene, $C_1-C_{20}$-alkyl acrylate and methacrylate, benzyl acrylate and methacrylate, vinyl $C_1-C_{20}$-alkyl ether, halogenated vinyl $C_1-C_{20}$-alkyl ether, vinyl $C_1-C_{20}$-alkyl ketone, maleic anhydride, butadiene, isoprene, chloroprene, and mixtures thereof. The content of the repeating units of other monomer is not more than 15 % by weight.

Among the optionally copolymerized monomers, (d) an acrylate or methacrylate having at least one nitrogen atom and (e) an acrylate and methacrylate having at least one hydroxyl group are useful to increase water- and oil-repellency and durability of the water- and oil-repellent, since the nitrogen atom or the hydroxyl group of the monomers (d) or (e) may increase the adhesion of the copolymer to the material such as fabrics by ionic bonding force. Among these two types of monomers, monomer (d) is more preferred. The content of monomers (d) and (e) is respectively from 0.1 to 5 % by weight. When the content is more than 5 % by weight, the dispersion stability is deteriorated.

As monomer (d), N-methylolacrylamide or N-methylolmethacrylamide is preferred, while aziridinyl acrylate and methacrylate, diacetoneacrylamide, diacetoneacrylamide, diacetonemethacrylamide, methylolated diacetoneacrylamide and methylalated diacetylmethacrylamide can be used.

As monomer (e), 2-hydroxy-3-chloropropyl acrylate or methacrylate is preferred, while hydroxy- $(C_2-C_5)$-alkyl acrylate and methacrylate (e.g. 2-hydroxypropyl acrylate and methacrylate) and monoethylene glycol monoacrylate and monomethacrylate (degree of polymerization of polyethylene glycol being from 2 to 40) can be used.

When the copolymer further comprises (f) repeating units derived from glycidyl acrylate or methacrylate in addition to essential repeating units (a), (b) and (c), the water- and oil-repellent comprising said copolymer has excellent durability, since repeating units (f) form covalent bonds between the treated material and the copolymer and cure the copolymer three dimensionally. The content of repeating units (f) in the copolymer is from 0.1 to 5 % by weight, preferably from 2 to 5 % by weight. When the content is more than 5 % by weight, the dispersion stability is deteriorated, while when it is less than 0.1 % by weight, the durability of the water- and oil-repellent is not effectively improved.

Further, the water- and oil-repellent comprising the copolymer consisting of repeating units (a), (b), (c) and (d) or (f) or repeating units (a), (b), (c), (d), (e) and (f) has greatly improved durability.

The copolymer of the present invention may be prepared by copolymerizing the above described monomers by a conventional method such as bulk polymerization, solution polymerization, suspension polymerization, emulsion polymerization, radiation polymerization, photopolymerization and the like. For example, the monomer mixture is emulsified in water in the presence of a surfactant and copolymerized with stirring. In the reaction system, a polymerization initiator such as an azo compound or a peroxide may be added. As the surfactant, any of anionic, cationic or nonionic surfactants may be used. Among these surfactants, a mixture of at least one cationic surfactant and at least one nonionic surfactant is preferred.

From the copolymer, the water- and oil-repellent can be formulated in any of the suitable application forms such as an emulsion, a solution or an aerosol.

The water- and oil-repellent may contain other polymers in addition to the copolymer of the present invention. Further, the water- and oil-repellent may contain other water-repellents or oil-repellents and suitable additives such as an insecticide, a flame-retardant, an anti-static agent, a dye stabilizer, a crease resisting agent, a perfume and the like.

Any material can be treated with the water- and oil-repellent of the present invention. Examples of such materials are fibers, yarns, fabrics, glass, paper, wood, leathers, furs, asbestos, bricks, cement, metals or metal oxides, ceramics, plastics, coated surfaces, plasters and the like. Among these materials, fibers of polyester, cotton, polyamide, acryl, silk, wool and textile blends and their fabrics are preferably treated by the water- and oil-repellent of the present invention.

PREFERRED EMBODIMENTS OF THE INVENTION

The present invention will be illustrated by the following Examples, in which the water- and oil-repellency were measured as follows:

The water repellency is expressed by the water repellency No. of Table 1, as determined by the spray method according to JIS (Japanese Industrial Standards) L-1092, and the oil repellency is expressed by the oil repellency No. of Table 2, as determined by dropping several drops of a test solvent on a surface of the cloth treated with the water- and oil-repellent and observing whether the drops are held on the surface for more than 3 minutes or not.

TABLE 1

| Water repellency No. | State |
|---|---|
| 100 | No wet at the surface |
| 90 | Slight wet at the surface |
| 80 | Drop like wet at the surface |
| 70 | Considerable wet at the surface |
| 50 | Wet over the whole surface |
| 0 | Complete wet of the surface |

TABLE 2

| Oil repellency No. | Test solvent |
|---|---|
| 7 | n-Octane |
| 6 | n-Decane |
| 5 | n-Dodecane |
| 4 | n-Tetradecane |
| 3 | n-Hexadecane |
| 2 | n-Hexane/Nujol (35/65 by eight) |
| 1 | Nujol |
| 0 | Nujol penetrated |

The "+" or "−" mark suffixed to the water or oil repellency No. in the following Tables represent that the result is slightly better or worse than said water or oil repellency No.

Resistance to washing is expressed by the water- and oil-repellency Nos. which are determined after washing a cloth treated with the water- and oil-repellent at 40° C. in water containing 2 g/liter of a detergent (Zabukoso, manufacture by Kao) with a bath ratio of 1:30 by weight (cloth: washing liquid) for 15 minutes by using a domestic washing machine followed by rinsing the cloth for 15 minutes, dehydrating it for 15 minutes and air drying at 110° C. for 3 minutes.

Resistance to dry cleaning is expressed by the water- and oil-repellency Nos. which are determined by washing a cloth treated with the water- and oil-repellent at 30° C. in tetrachloroethylene by using a Launder-O-meter followed by drying at room temperature and then measuring the water- and oil-repellency.

IPA (isopropyl alcohol) resistance is determined by diluting the water- and oil-repellent with a diluent shown in Table 3 and expressed by the maximum number at which no precipitation is formed.

TABLE 3

| IPA resistance No. | Diluent |
|---|---|
| 100 | IPA 100% |
| 90 | 90% aqueous solution of IPA |
| 80 | 80% aqueous solution of IPA |
| 70 | 70% aqueous solution of IPA |
| 60 | 60% aqueous solution of IPA |
| 50 | 50% aqueous solution of IPA |
| 40 | 40% aqueous solution of IPA |
| 30 | 30% aqueous solution of IPA |
| 20 | 20% aqueous solution of IPA |
| 10 | 10% aqueous solution of IPA |
| 0 | Water |

Resistance to slippage is determined according to ASTM D 1336-64 (1970) by means of a fabric shift tester. A prescribed sized piece of fabric to be tested is clamped at opposite sides and placed between a pair of grippers, the upper one of which is loaded with a load of 2 kg with fixing the bottom one of which. After twice reciprocating the upper gripper with a prescribed traveling distance, the fabric shift, namely the largest distance between the adjacent yarns is measured by means of a microscope. Resistance to slippage is expressed in terms of the measured fabric shift (mm). When the fabric shift of the cloth treated with the water- and oil-repellent is less than that of the untreated cloth the, resistance to slippage is good. In the Example, the fabric shift of the untreated cloth was 1.0 mm.

EXAMPLES 1–20 AND COMPARATIVE EXAMPLES 1–3

In a 500 ml flask, predetermined amounts of the monomers shown in Table 4 (the total amount of the monomers being 100 g) were charged, and then deoxygenated water (160 g), acetone (50 g), n-laurylmercaptan (0.2 g), an emulsifier (9 g) of the formula

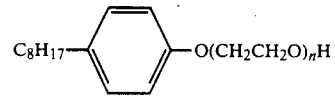

in which n is 20 on the average (HS-220, trade name of Nippon Fat and Oil) and a compound (3.4 g) of the formula:

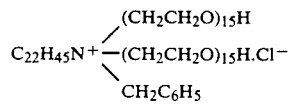

were added and stirred at 60° C. for one hour under a nitrogen stream. Thereafter, a solution of azobisisobutylamidine hydrochloride (1 g) in water (10 g) was added and stirred at 60° C. for 3 hours under a nitrogen stream to copolymerize the monomers. The conversion in the polymerization reaction was more than 99 % according to gas chromatography. From this conversion, it was confirmed that the weight ratio of the repeating units in the copolymer substantially corresponded to that of the monomers charged. The obtained emulsion contained 30 % by weight of the nonvolatile components.

The IPA resistance of the emulsion was measured. The result is shown in Table 4.

The emulsion was diluted with water to a nonvolatile content of 12 %. In the diluted liquid, a polyester fabric for measurement of water- and oil-repellency or a nylon fabric for measurement of slippage was dipped, squeezed by rolls, predried at 80° C. for 3 minutes and heated at 150° C. for 3 minutes. The treated polyester fabric was tested on its water- and oil-repellency and then its washing and dry cleaning resistance, and the treated nylon fabric was tested on slippage. The results are shown in Table 4.

TABLE 4

| | Monomer composition*[1] (weight ratio) | IPA resistance | Initial Oil repellency | Initial Water repellency | After washing Oil repellency | After washing Water repellency | After dry cleaning Oil repellency | After dry cleaning Water repellency | Fabric shift (mm) |
|---|---|---|---|---|---|---|---|---|---|
| Ex. No. | | | | | | | | | |
| 1 | FA/StA/CHMA/GMA (60/32/5/3) | 20 | 2 | 90 | 0 | 50 | 0 | 50 | 0.8 |
| 2 | FA/StA/CHMA/NMAM (60/33/5/2) | 20 | 2 | 90 | 1 | 50 | 1 | 50 | 0.8 |
| 3 | FA/StA/CHMA/* (60/33/5/2) | 40 | 2 | 90 | 1 | 50 | 1 | 50 | 0.8 |
| 4 | FA/StA/CHMA/NMAM/* (60/32/5/2/1) | 50 | 4 | 100 | 1 | 70 | 1 | 50+ | 0.8 |
| 5 | FA/StA/CHMA/GMA/NMAM (60/30/5/3/2) | 50 | 4 | 90+ | 1 | 50+ | 1 | 70 | 0.8 |
| 6 | FA/StA/CHMA/GMA/* (60/30/5/3/2) | 70 | 4 | 90+ | 1 | 50+ | 1 | 70 | 0.8 |
| 7 | FA/StA/EHMA (60/35/5) | 20 | 2 | 80+ | 0 | 50− | 0 | 50− | 0.8 |
| 8 | FA/StA/CHMA (60/35/5) | 20 | 2 | 80+ | 0 | 50− | 0 | 50− | 0.8 |
| 9 | FA/StA/EHMA/NMAM/* (60/32/5/2/1) | 50 | 4 | 100 | 1 | 70 | 1 | 70 | 0.8 |
| 10 | FA/StA/EHMA/NMAM/GMA/* (65/15/15/2/2/1) | 80 | 6 | 100+ | 3 | 100 | 2 | 80 | 0.7 |
| 11 | FA/StA/CHMA/GMA/NMAM/* (60/13/20/3/2/2) | 80 | 5 | 100+ | 2 | 100 | 2 | 80 | 0.7 |
| 12 | FA/StMA/CHMA/GMA/NMAM/* (60/28/5/3/2/2) | 80 | 5 | 100+ | 2 | 100 | 2 | 80 | 0.8 |
| 13 | FA/StA/CHA/GMA/NMAM/* (50/38/5/3/2/2) | 70 | 4 | 100 | 1 | 100 | 2 | 80 | 0.8 |
| 14 | FAM/StA/CHMA/GMA/NMAM/* (60/28/5/3/2/2) | 80 | 5 | 100+ | 2 | 100 | 2 | 80 | 0.8 |
| 15 | FA/StA/EA/GMA/NMAM/* (60/28/5/3/2/2) | 90 | 5 | 100+ | 2 | 100 | 2 | 80 | 0.8 |
| 16 | FA/StA/EMA/GMA/NMAM/* (60/28/5/3/2/2) | 90 | 5 | 100+ | 2 | 100 | 2 | 80 | 0.8 |
| 17 | FA/StA/n-BMA/GMA/NMAM/* (60/28/5/3/2/2) | 90 | 6 | 100 | 3 | 90+ | 2 | 80 | 0.8 |
| 18 | FA/StA/i-BMA/GMA/NMAM/* (60/28/5/3/2/2) | 90 | 5 | 100+ | 2 | 100 | 2 | 80 | 0.8 |
| 19 | FA/StA/CHMA/GA/DAAM/* (60/28/5/3/2/2) | 80 | 5 | 100+ | 2 | 100 | 2 | 80 | 0.8 |
| 20 | FA/StA/CHMA/GMA/NMAM/PE (60/28/5/3/2/2) | 80 | 5 | 100+ | 2 | 100 | 2 | 80 | 0.8 |
| Comp. Ex. No. | | | | | | | | | |
| 1 | FA/StA (60/40) | 0 | 2 | 80 | 0 | 0 | 0 | 0 | 1.8 |
| 2 | FA/CHMA (60/40) | 30 | 2 | 80 | 0 | 0 | 0 | 0 | 0.6 |
| 3 | FA/EHMA (60/40) | 30 | 2 | 80 | 0 | 0 | 0 | 0 | 0.6 |

Note: *[1]
FA: $CH_2=CHCOOCH_2CH_2CH_8F_{17}$;
FMA: $CH_2=C(CH_3)COOCH_2CH_2C_8F_{17}$
StA: $CH_2=CHCOOC_{18}H_{37}$;
StMA: $CH_2=C(CH_3)COOC_{18}H_{37}$

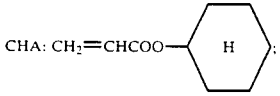
CHA: $CH_2=CHCOO-\phantom{xx}$ H ;

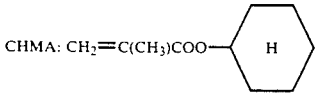
CHMA: $CH_2=C(CH_3)COO-\phantom{xx}$ H

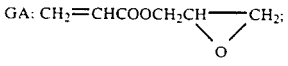
GA: $CH_2=CHCOOCH_2CH\!\!-\!\!-\!\!CH_2$;

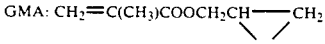
GMA: $CH_2=C(CH_3)COOCH_2CH\!\!-\!\!-\!\!CH_2$

NMAM: $CH_2=CHCONHCH_2OH$;
*: $CH_2=C(CH_3)COOCH_2CH(OH)CH_2Cl$
EA: $CH_2=CHCOOCH_2CH_3$;
EMA: $CH_2=CHCOOCH_2CH_3$
n-BMA: $CH_2=C(CH_3)COOCH_2CH_2CH_2CH_3$;
iso-BMA: $CH_2=C(CH_3)COOCH_2CH(CH_3)_2$
DAAM: $CH_2=CHCONHCH(OH)C(CH_3)_2CH_2COCH_3$
PE: $CH_2=C(CH_3)COO(CH_2CH_2O)_nH$ (n = 1–5) (Blenmer PE-90 (trade mark) of Nippon Oil & Fat)
EHMA: $CH_2=C(CH_3)COOCH_2CH(CH_2CH_3)CH_2CH_2CH_2CH_3$

What is claimed is:

1. A fluorine-containing copolymer comprising
   (a) 40 to 90 % by weight of repeating units of a polymerizable compound having a $C_4$–$C_{20}$ perfluoroalkyl group,
   (b) 5 to 50 % by weight of repeating units of at least one unsaturated ester selected from the group consisting of stearyl acrylate and stearyl methacrylate,
   (c) 5 to 50 % by weight of repeating units of at least one monomer selected from the group consisting of alkyl acrylate or methyacrylate having 2 to 8 carbon atoms in the alkyl group, cyclohexyl acrylate and cyclohexyl methacrylate.

2. The fluorine-containing copolymer according to claim 1, which further comprises 0.1 to 5 % by weight of (d) repeating units of an acrylate or methacrylate having at least one nitrogen atom or (e) repeating units of an acrylate and methacrylate having at least one hydroxyl group or (f) repeating units of glycidyl acrylate or methacrylate.

3. The fluorine-containing copolymer according to claim 1, which further comprises 0.1 to 5 % by weight of (d) repeating units of an acrylate or methacrylate having at least one nitrogen atom, and 0.1 to 5 % by weight of (e) repeating units of an acrylate and methacrylate having at least one hydroxyl group or (f) repeating units of glycidyl acrylate or methacrylate.

4. The fluorine-containing copolymer according to claim 1, which further comprises 0.1 to 5 % by weight of (e) repeating units of an acrylate and methacrylate having at least one hydroxyl group and 0.1 to 5 % by weight of (f) repeating units of glycidyl acrylate or methacrylate.

5. The fluorine-containing copolymer according to claim 1, which further comprises 0.1 to 5 % by weight of (d) repeating units of an acrylate or methacrylate having at least one nitrogen atom, 0.1 to 5 % by weight of (e) repeating units of an acrylate and methacrylate having at least one hydroxyl group and 0.1 to 5 % by weight of (f) repeating units of glycidyl acrylate or methacrylate.

6. A water- and oil-repellent comprising a fluorine-containing copolymer which comprises
   (a) 40 to 90% by weight of repeating units of a polymerizable compound having a $C_4$–$C_{20}$ perfluoroalkyl group,
   (b) 5 to 50% by weight of repeating units of at least one unsaturated ester selected from the group consisting of stearyl acrylate and stearyl methacrylate,
   (c) 5 to 50 % by weight of repeating units of at least one monomer selected from the group consisting of alkyl acrylate or methacrylate having 2 to 8 carbon atoms in the alkyl group, cyclohexyl acrylate and cyclohexyl methacrylate.

7. The water- and oil-repellent according to claim 6, wherein the copolymer further comprises 0.1 to 5 % by weight of (d) repeating units of an acrylate or methacrylate having at least one nitrogen atom or (e) repeating units of an acrylate and methacrylate having at least one hydroxyl group of (f) repeating units of glycidyl acrylate or methacrylate.

8. The water- and oil-repellent according to claim 6, wherein the copolymer further comprises 0.1 to 5 % by weight of (d) repeating units of an acrylate or methacrylate having at least one nitrogen atom, and 0.1 to 5 % by weight of (e) repeating units of an acrylate and methacrylate having at least one hydroxyl group or (f) repeating units of glycidyl acrylate or methacrylate.

9. The water- and oil-repellent according to claim 6, wherein the copolymer further comprises 0.1 to 5 % by weight of (e) repeating units of an acrylate and methacrylate having at least one hydroxyl group and 0.1 to 5 % by weight of (f) repeating units of glycidyl acrylate or methacrylate.

10. The water- and oil-repellent according to claim 6, wherein the copolymer further comprises 0.1 to 5 % by weight of (d) repeating units of an acrylate or methacrylate having at least one nitrogen atom, 0.1 to 5 % by weight of (e) repeating units of an acrylate and methacrylate having at least one hydroxyl group and 0.1 to 5 % by weight of (f) repeating units of glycidyl acrylate or methacrylate.

11. The fluorine-containing copolymer according to claim 1, wherein the polymerizable compound of repeating units (a) is selected from the group consisting of

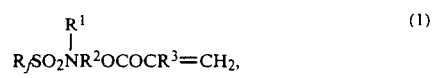
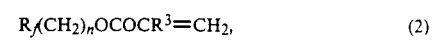
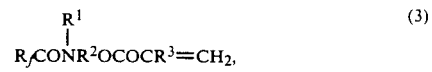
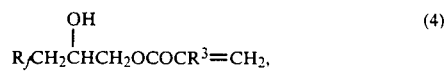
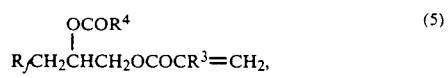

(6) $R_f(CH_2)_mCOOCH=CH_2$ and
(7) $R_fCH=CH(CH_2)_nOCOCR^3=CH_2$ wherein $R_f$ is a $C_4$–$C_{20}$ perfluoroalkyl group, $R^1$ is a hydrogen atom or a $C_1$–$C_{10}$ alkyl group, $R^2$ is a $C_1$–$C_{10}$ alkylene group, $R^3$ is a hydrogen atom or a methyl group, $R^4$ is a $C_1$–$C_{17}$ alkyl group, n is a number of 1 to 10, and m is a number of 0 to 10.

12. The fluorine-containing copolymer according to claim 1, wherein the weight of the repeating units of (a) is 50 to 90%.

13. The fluorine-containing copolymer according to claim 1, wherein the weight of the repeating units of (b) is 15 to 35%.

14. The fluorine-containing copolymer according to claim 1, wherein the weight of the repeating units of (c) is 5 to 25%.

15. The water- and oil-repellent according to claim 6, wherein the polymerizable compound of repeating units (a) is selected from the group consisting of

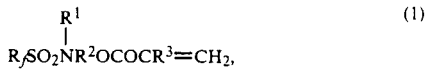
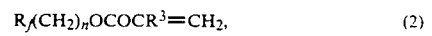
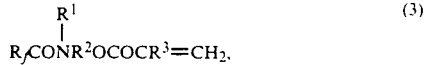
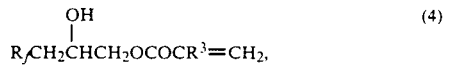

-continued $$R_fCH_2\overset{OCOR^4}{\underset{|}{CH}}CH_2OCOCR^3=CH_2, \quad (5)$$

(6) $R_f(CH_2)_mCOOCH=CH_2$ and (7) $R_fCH=CH(CH_2)_nOCOCR^3=CH_2$ wherein $R_f$ is a $C_4$-$C_{20}$ perfluoroalkyl group, $R^1$ is a hydrogen atom or a $A_1$-$C_{10}$ alkyl group, $R^2$ is a $C_1$-$C_{10}$ alkylene group, $R^3$ is a hydrogen atom or a methyl group, $R^4$ is a $C_1$-$C_{17}$ alkyl group, n is a number of 1 to 10, and m is a number of 0 to 10.

16. The water- and oil-repellent according to claim 6, wherein the weight of the repeating units of (a) is 50 to 90%.

17. The water- and oil-repellent according to claim 6, wherein the weight of the repeating units of (b) is 15 to 35%.

18. The water- and oil-repellent according to claim 6, wherein the weight of the repeating units of (c) is 5 to 25%.

* * * * *